(12) United States Patent
McMahon et al.

(10) Patent No.: US 9,037,597 B2
(45) Date of Patent: May 19, 2015

(54) VERIFYING FILE VERSIONS IN A NETWORKED COMPUTING ENVIRONMENT

(75) Inventors: Patrick W. McMahon, Erie, PA (US); Russell S. Day, Simpsonville, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/987,513

(22) Filed: Jan. 10, 2011

(65) Prior Publication Data

US 2012/0179708 A1 Jul. 12, 2012

(51) Int. Cl.
*G06F 17/30* (2006.01)

(52) U.S. Cl.
CPC .................................. *G06F 17/3023* (2013.01)

(58) Field of Classification Search
None
See application file for complete search history.

(56) References Cited

U.S. PATENT DOCUMENTS

| | | | |
|---|---|---|---|
| 5,649,200 A * | 7/1997 | Leblang et al. | 717/122 |
| 7,363,323 B2 * | 4/2008 | Nagahara | 707/769 |
| 7,415,478 B2 | 8/2008 | Owen et al. | |
| 7,702,661 B2 | 4/2010 | Bhatia | |
| 7,925,702 B2 * | 4/2011 | Rood et al. | 709/205 |
| 8,161,004 B2 * | 4/2012 | Teng et al. | 707/638 |
| 8,315,997 B1 * | 11/2012 | Peled et al. | 707/695 |
| 2004/0167899 A1 | 8/2004 | Patadia et al. | |
| 2006/0224626 A1 | 10/2006 | Lakshminath et al. | |
| 2007/0214365 A1 | 9/2007 | Cornett et al. | |
| 2008/0005195 A1 * | 1/2008 | Li | 707/203 |
| 2008/0243846 A1 * | 10/2008 | Rasmussen | 707/8 |
| 2008/0281863 A1 | 11/2008 | Pospisil et al. | |
| 2009/0313321 A1 * | 12/2009 | Parsons et al. | 709/203 |
| 2010/0131940 A1 * | 5/2010 | Jazdzewski | 717/170 |
| 2010/0191783 A1 * | 7/2010 | Mason et al. | 707/822 |
| 2010/0257142 A1 * | 10/2010 | Murphy et al. | 707/681 |
| 2010/0257346 A1 * | 10/2010 | Sosnosky et al. | 713/2 |
| 2010/0274765 A1 * | 10/2010 | Murphy et al. | 707/652 |
| 2010/0274772 A1 * | 10/2010 | Samuels | 707/693 |
| 2010/0274983 A1 * | 10/2010 | Murphy et al. | 711/162 |
| 2010/0332549 A1 * | 12/2010 | Nichols et al. | 707/802 |
| 2010/0332629 A1 * | 12/2010 | Cotugno et al. | 709/221 |
| 2010/0333116 A1 * | 12/2010 | Prahlad et al. | 719/328 |
| 2011/0060806 A1 * | 3/2011 | Boscolo et al. | 709/213 |
| 2011/0093597 A1 * | 4/2011 | Hopmann et al. | 709/226 |

(Continued)

OTHER PUBLICATIONS

Wahli, International Technical Support Organization Software Configuration Management a Clear Case for IBM Rational ClearCase and ClearQuest UCM, Dec. 2004, pp. 1-398.*

(Continued)

*Primary Examiner* — Kaveh Abrishamkar
*Assistant Examiner* — James J Wilcox
(74) *Attorney, Agent, or Firm* — William E. Schiesser; Keohane & D'Alessandro PLLC; Hunter E. Webb

(57) ABSTRACT

Embodiments of the present invention provide an approach for identifying a most recent version of an electronic file (e.g., prior to or while the electronic file is being opened). In one embodiment, an application programming interface (API), plug-in, or the like, can enable both file management tools and on-line repositories to exchange file information. Along these lines, this approach can be especially useful for common business assets such as textual documents, spreadsheets, and presentations. Moreover, this approach is a "pro-active" function in that it does not require the user to consciously seek out and determine if a newer version is available. The implementation of the method performs this function automatically.

20 Claims, 5 Drawing Sheets

(56) References Cited

U.S. PATENT DOCUMENTS

| | | | |
|---|---|---|---|
| 2011/0126168 A1* | 5/2011 | Ilyayev | 717/103 |
| 2011/0137947 A1* | 6/2011 | Dawson et al. | 707/785 |
| 2011/0208695 A1* | 8/2011 | Anand et al. | 707/610 |
| 2011/0208958 A1* | 8/2011 | Stuedi et al. | 713/150 |

OTHER PUBLICATIONS

Altova's XML Diff Tool, (archived from: http://web.archive.org/web/20101206024416/http://www.altova.com/diffdog/xml-diff.html, Dec. 6, 2010, pp. 1-6).*

Hermetic Word Frequency Counter Advanced Version, (Archived from: http://web.archive.org/web/20060925114640/http://www.hermetic.ch/wfca/wfca.htm, Sep. 25, 2006, pp. 1-7).*

Typetester—Compare Fonts for the Screen (Archived from: http://web.archive.org/web/20060215232251/http://typetester.maratz.com/, Feb. 15, 2006, pp. 1-7).*

Mell et al., "The NIST Definition of Cloud Computing", National Institute of Standards and Technology, Information Technology Laboratory, Version 15, Oct. 7, 2009, 2 pages.

* cited by examiner

VERIFYING FILE VERSIONS IN A NETWORKED COMPUTING ENVIRONMENT

TECHNICAL FIELD

The present invention relates to document version verification. Specifically, the present invention relates to identifying current file versions in a networked computing environment (e.g., a cloud computing environment).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, storage devices.

When sharing documents such as presentations, spreadsheets, or textual documents, it can be unclear to the end user whether or not the version of the document they are looking at is the most recent. This is especially true when documents are centrally shared via corporate or public repositories. A typical user may expend an inordinate amount of unproductive time searching the most current. If a document being worked on is not the most current version, the user may be faced with lost updates and duplication of effort.

SUMMARY

Embodiments of the present invention provide an approach for identifying a most recent version of an electronic file (e.g., prior to, or while the electronic file is being opened). In one embodiment, an application programming interface (API), plug-in, or the like, can enable both file management tools and on-line repositories to exchange file information. Along these lines, this approach can be especially useful for common business assets such as textual documents, spreadsheets, and presentations. Moreover, this approach is a "pro-active" function in that it doesn't require the user to consciously seek out and determine if a newer version is available. In one embodiment, methods of the present invention could perform this function automatically. In a typical embodiment, when a request to open an electronic file is made, the electronic file is compared to a set of electronic files stored in at least one repository. Along these lines, the comparison can be made based on any information that would indicate a recency or timing of the documents. Examples include (among others), content within the files themselves and meta data associated with the files (e.g., time stamps, word counts, version identities, file names, markups, markup meta data, font/pitch sizes, font colors, or content formatting, etc.). Regardless, based on this comparison, it will be determined (before the electronic file is opened) whether the electronic file comprises the most current version. If not, the most current version is identified from the set of files.

A first aspect of the present invention provides a method for identifying a most current version of an electronic file in a networked computing environment, comprising: receiving a request to open the electronic file; comparing the electronic file to a set of electronic files stored in at least one repository in the networked computing environment; determining if the electronic file comprises the most current version based on the comparing before the electronic file is opened; and identifying the most current version from the set of files if the determining indicates that the electronic file does not comprise the most current version.

A second aspect of the present invention provides a system for identifying a most current version of an electronic file in a networked computing environment, comprising: a bus; a processor coupled to the bus; and a memory medium coupled to the bus, the memory medium comprising instructions to: receive a request to open the electronic file; compare the electronic file to a set of electronic files stored in at least one repository in the networked computing environment; determine if the electronic file comprises the most current version based on the comparison before the electronic file is opened; and identify the most current version from the set of files if the determination indicates that the electronic file does not comprise the most current version.

A third aspect of the present invention provides a computer program product for identifying a most current version of an electronic file in a networked computing environment, the computer program product comprising: a computer readable storage medium, and program instructions stored on the computer readable storage medium, to: receive a request to open the electronic file; compare the electronic file to a set of electronic files stored in at least one repository in the networked computing environment; determine if the electronic file comprises the most current version based on the comparison before the electronic file is opened; and identify the most current version from the set of files if the determination indicates that the electronic file does not comprise the most current version.

A fourth aspect of the present invention provides a method for deploying a system for identifying a most current version of an electronic file in a networked computing environment, comprising: deploying a computer infrastructure being operable to: receive a request to open the electronic file; compare the electronic file to a set of electronic files stored in at least one repository in the networked computing environment; determine if the electronic file comprises the most current version based on the comparison before the electronic file is opened; and identify the most current version from the set of files if the determination indicates that the electronic file does not comprise the most current version.

BRIEF DESCRIPTION OF THE DRAWINGS

These and other features of this invention will be more readily understood from the following detailed description of the various aspects of the invention taken in conjunction with the accompanying drawings in which.

Figure 1:
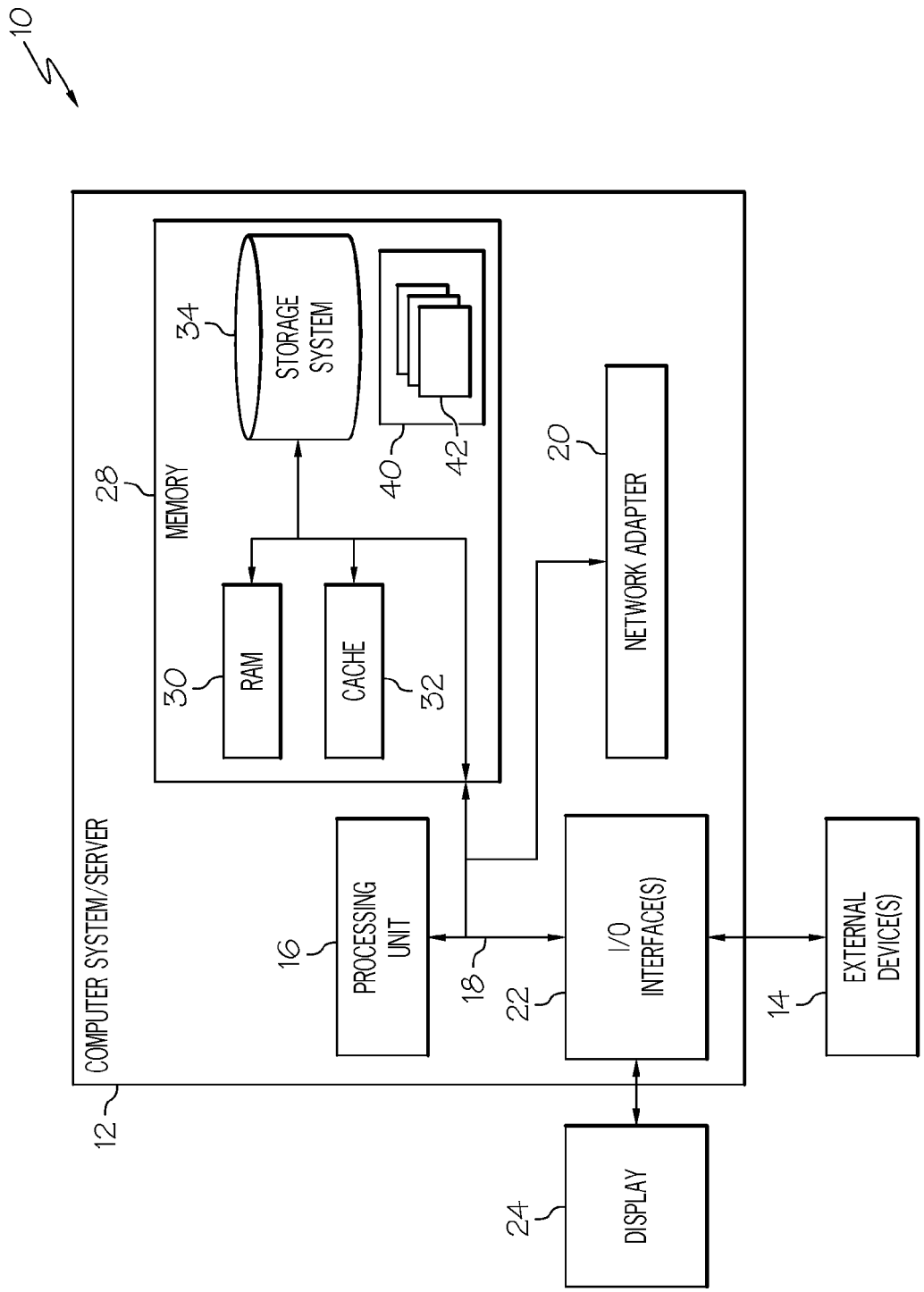
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for identifying a most recent version of an electronic file (e.g., prior to, or while the electronic file is being opened). In one embodiment, an application programming interface (API), plug-in, or the like, can enable both file management tools and on-line repositories to exchange file information. Along these lines, this approach can be especially useful for common business assets such as textual documents, spreadsheets, and presentations. Moreover, this approach is a "pro-active" function in that it doesn't require the user to consciously seek out and determine if a newer version is available. In one embodiment, methods of the present invention could perform this function automatically. In a typical embodiment, when a request to open an electronic file is made, the electronic file is compared to a set of electronic files stored in at least one repository. Along these lines, the comparison can be made based on any information that would indicate a recency or timing of the documents. Examples include (among others), content within the files themselves and meta data associated with the files files (e.g., time stamps, word counts, version identities, file names, markups, markup meta data, font/pitch sizes, font colors, or content formatting, etc.). Regardless, based on this comparison, it will be determined (before the electronic file is opened) whether the electronic file comprises the most current version. If not, the most current version is identified from the set of files.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage medium including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage medium. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium. A computer readable signal medium may be any computer readable medium that is not a computer readable storage medium and that can communicate or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

File version program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Along these lines, file version program/utility 40 can be embodied as an API, plug-in, etc. that is incorporated within and/or works in conjunction with existing applications (e.g., word processing programs, spreadsheet programs, presentation programs, etc.).

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
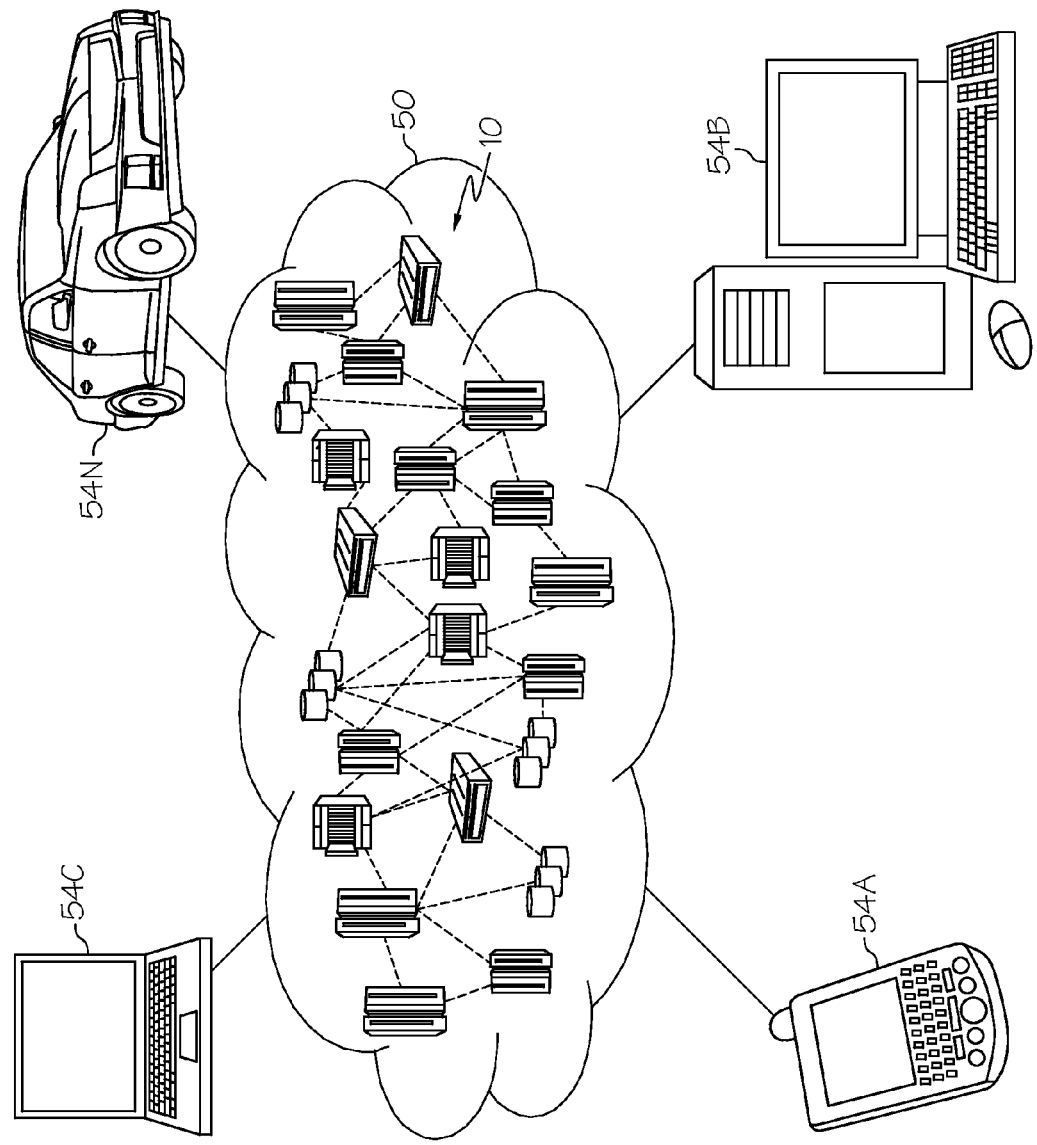
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
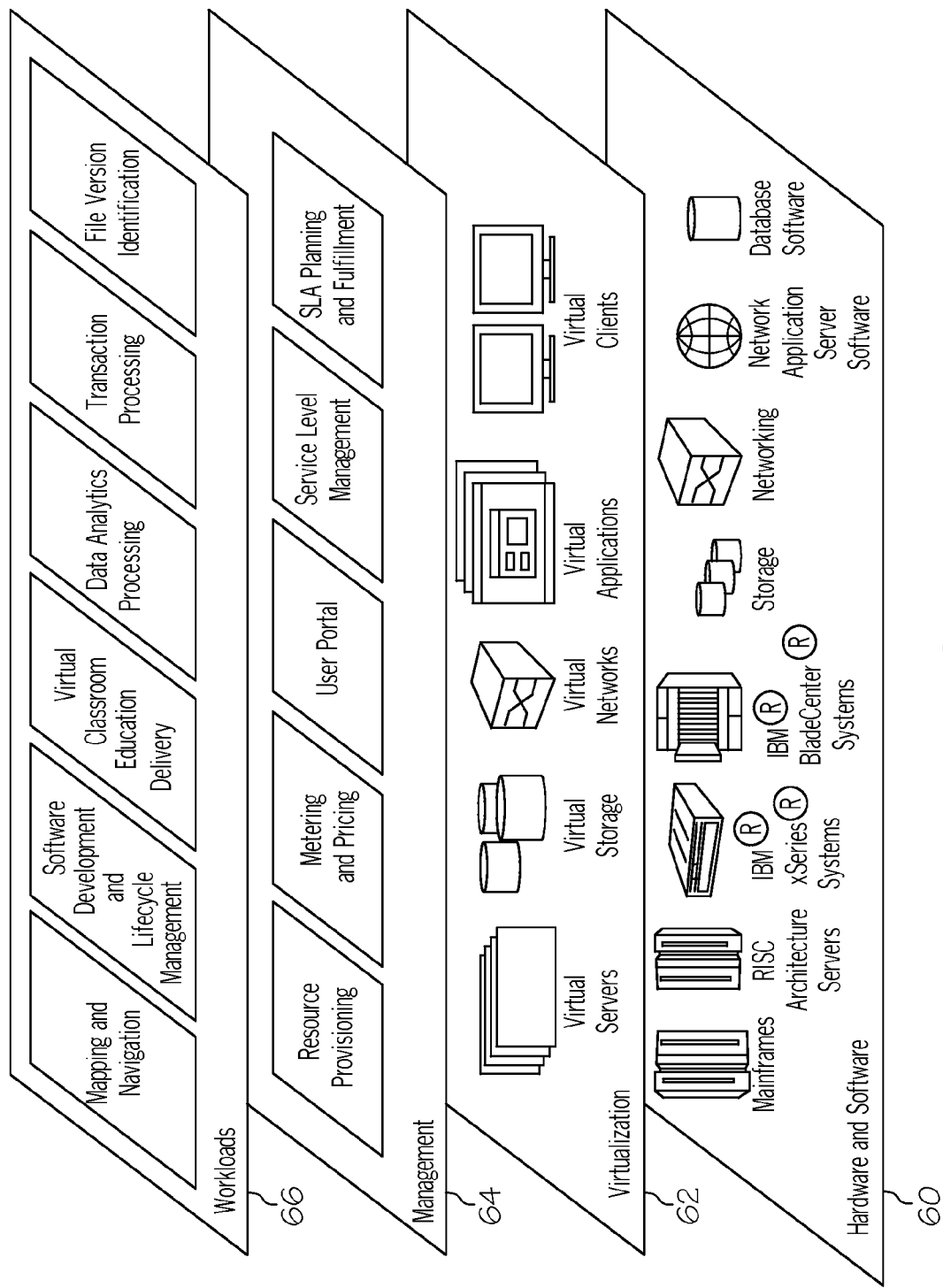
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and file version identification. As mentioned above, all of the foregoing examples described with respect to FIG. 3 are illustrative only, and the invention is not limited to these examples.

It is understood that all functions of the present invention as described herein typically may be performed by the file version identification function, which can be tangibly embodied as modules of program code 42 of file version program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
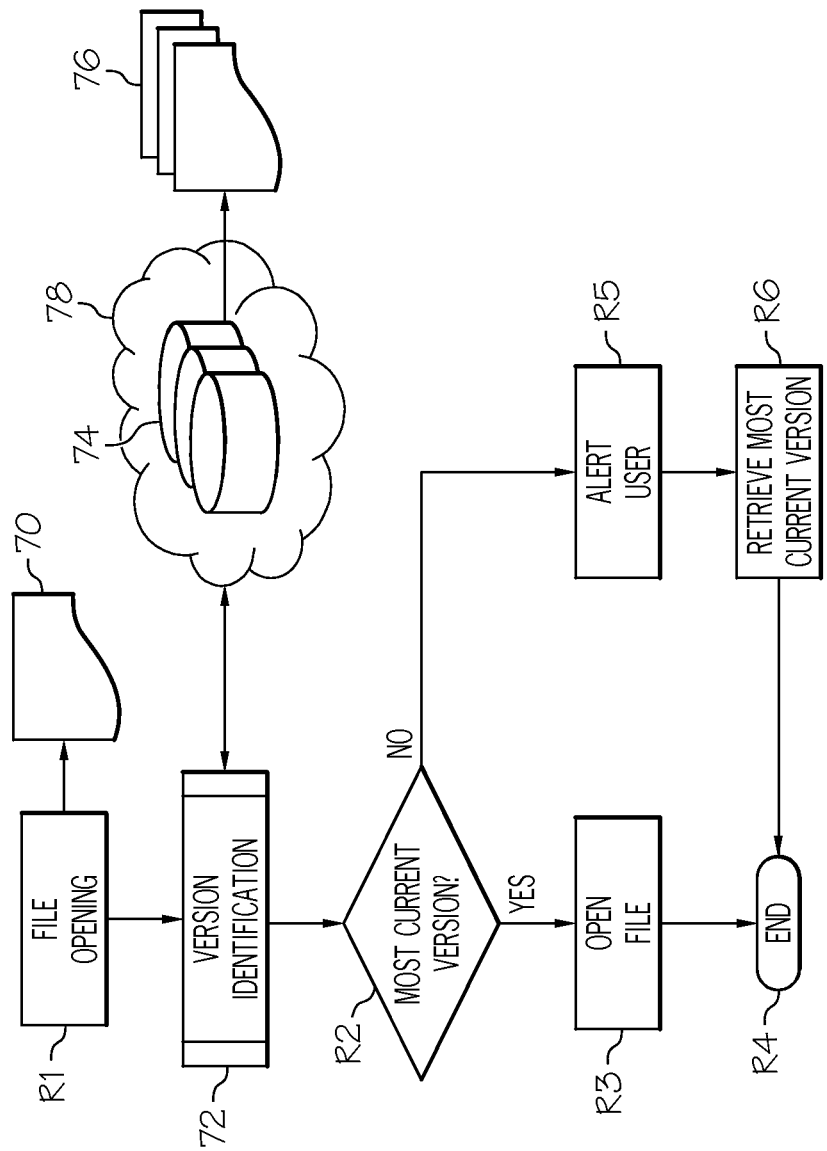
FIG. 4 depicts a component flow diagram according to an embodiment of the present invention.

Referring now to FIG. 4, a component flow diagram according to an embodiment of the present invention is shown. As depicted, in step R1, an (electronic) file 70 is requested to be opened. Along these lines, file 70 can contain any type of content now known or later developed. As file 70 is being opened, an API, plug-in, or the like, will perform a version identification to ensure that the specific file being opened is the most current version thereof. Specifically, file 70 will be compared to a set of (electronic) files 74 stored in a set of repositories 76 within the networked computing environment 78. Based on the comparison, it will be determined in step R2 (e.g., via a version identification function 72) (before file 70 is opened) whether file 70 comprises the most current version. Along these lines, content within files 70 and 76 can be compared to see whether file 70 comprises the most current version of content. Alternatively, meta data (e.g., time stamps, word counts, version identifies, file names, markups, markup meta data, font/pitch size, font color, formatting) associated with files 70 and 76 can be compared to identify a most recent version. If file 70 is the most recent, it will be opened in step R3 before the process is ended in step R4. However, if file 70 is determined not to be the most current version in step R2, an alert is communicated in step R5. Also, in step R6, the most current version of the file will be identified, retrieved, and/or opened from set of files 76. It is noted that in retrieving files from repositories, retrieval and version comparison is possible from multiple different environments (e.g., private cloud computing environments, public cloud computing environments, hybrid cloud computing environments, grid computing environments, a standalone workstation). Still yet, the comparison functions herein could further comprise a rules engine that uses previously defined rules for locating the files, comparing the files, etc.

Figure 5:
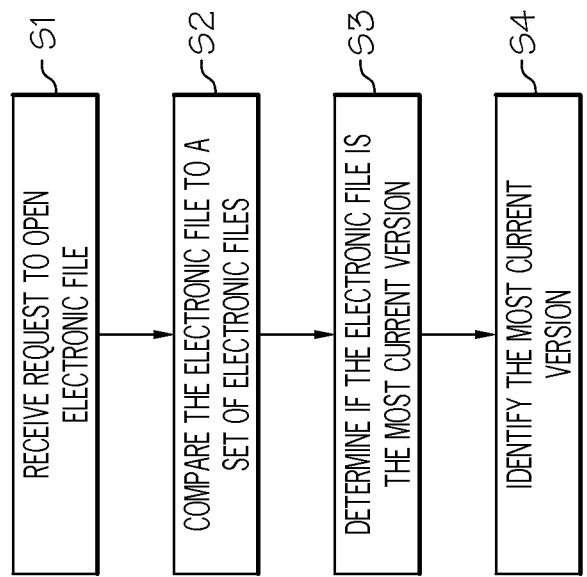
FIG. 5 depicts a method flow diagram according to an embodiment of the present invention.

This process is summarized in the method flow diagram of FIG. 5. As depicted, in step S1, a request to open an electronic file is received. In step S2, the electronic file is compared (e.g., content therein is compared, meta data associated therewith is compared, etc.) to a set of electronic files stored in at least one repository in the networked (e.g., cloud) computing environment. In step S3, it is determined if the electronic file comprises the most current version based on the comparing before the electronic file is opened. In step S4, the most current version is identified from the set of files if the electronic file does not comprise the most current version.

While shown and described herein as a file version identification solution, it is understood that the invention further provides various alternative embodiments. For example, in one embodiment, the invention provides a computer-readable/useable medium that includes computer program code to enable a computer infrastructure to provide file version identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide file version identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for file version identification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for identifying a most current version of an electronic file in a networked computing environment, comprising:
   receiving a request to open the electronic file;
   comparing the electronic file directly to each of a set of electronic files that are versions of the electronic file stored in at least one repository in the networked computing environment to determine, based on the comparing, differences between a content within the electronic file and corresponding content within each of the set of electronic files;
   comparing meta data associated with the electronic file and contained within the electronic file with meta data associated with the set of electronic files and contained within the electronic file, the meta data comprising pitch sizes and markup meta data;
   determining if the electronic file comprises the most current version based on the comparing before the electronic file is opened;
   identifying the most current version from the set of files if the determining indicates that the electronic file does not comprise the most current version; and
   responsive to the identifying, automatically opening the most current version.

2. The method of claim 1, the determining comprising determining if the electronic file comprises a most current version of the content based on the comparing.

3. The method of claim 2, the identifying comprising identifying the most current version of the content from the set of files if the determining indicates that the electronic file does not comprise the most current version of the content.

4. The method of claim 1, the meta data associated with the electronic file and the meta data associated with the set of files further comprising at least one of the following: time stamps, word counts, version identities, file names, markups, font sizes, font colors, or content formatting.

5. The method of claim 1, the comparing, the determining, and the identifying being performed using an application programming interface (API).

6. The method of claim 1, the networked computing environment comprising a cloud computing environment.

7. The method of claim 1, further comprising communicating an alert to a sender of the request.

8. A system for identifying a most current version of an electronic file in a networked computing environment, comprising:
- a bus;
- a processor coupled to the bus; and
- a memory medium coupled to the bus, the memory medium comprising instructions to:
  - receive a request to open the electronic file;
  - compare the electronic file directly to each of a set of electronic files that are versions of the electronic file stored in at least one repository in the networked computing environment to determine, based on the comparing, differences between a content within the electronic file and corresponding content within each of the set of electronic files;
  - compare meta data associated with the electronic file and contained within the electronic file with meta data associated with the set of electronic files and contained within the electronic file, the meta data comprising pitch sizes and markup meta data;
  - determine if the electronic file comprises the most current version based on the comparison before the electronic file is opened; and
  - identify and automatically open the most current version from the set of files if the determination indicates that the electronic file does not comprise the most current version.

9. The system of claim 8, the memory medium further comprising instructions to determine if the electronic file comprises a most current version of the content based on the comparison.

10. The system of claim 9, the memory medium further comprising instructions to identify the most current version of the content from the set of files if the determining indicates that the electronic file does not comprise the most current version of the content.

11. The system of claim 9, the memory medium further comprising instructions to communicate an alert to a sender of the request.

12. The system of claim 8, the meta data associated with the electronic file and the meta data associated with the set of files further comprising at least one of the following: time stamps, word counts, version identities, file names, font sizes, font colors, or content formatting.

13. The system of claim 8, the networked computing environment comprising a cloud computing environment.

14. A computer program product for identifying a most current version of an electronic file in a networked computing environment, the computer program product comprising a non-transitory computer readable storage medium, and program instructions stored on the non-transitory computer readable storage medium, to:
  - receive a request to open the electronic file;
  - compare the electronic file directly to each of a set of electronic files that are versions of the electronic file stored in at least one repository in the networked computing environment to determine, based on the comparing, differences between a content within the electronic file and corresponding content within each of the set of electronic files;
  - compare meta data associated with the electronic file and contained within the electronic file with meta data associated with the set of electronic files and contained within the electronic file, the meta data comprising pitch sizes and markup meta data;
  - determine if the electronic file comprises the most current version based on the comparison before the electronic file is opened;
  - identify the most current version from the set of files if the determination indicates that the electronic file does not comprise the most current version; and
  - responsive to the identifying, automatically opening the most current version.

15. The computer program product of claim 14, further comprising program instructions stored on the non-transitory computer readable storage medium to determine if the electronic file comprises a most current version of the content based on the comparison.

16. The computer program product of claim 15, further comprising program instructions stored on the non-transitory computer readable storage medium to identify the most current version of the content from the set of files if the determining indicates that the electronic file does not comprise the most current version of the content.

17. The computer program product of claim 14, the meta data associated with the electronic file and the meta data associated with the set of files further comprising at least one of the following: time stamps, version identities, file names, markups, font sizes, font colors, or content formatting.

18. The computer program product of claim 14, the networked computing environment comprising a cloud computing environment.

19. The computer program product of claim 14, further comprising program instructions stored on the non-transitory computer readable storage medium to communicate an alert to a sender of the request.

20. A method for deploying a system for identifying a most current version of an electronic file in a networked computing environment, comprising:
  - deploying a computer infrastructure being operable to:
    - receive a request to open the electronic file;
    - compare the electronic file directly to each of a set of electronic files that are versions of the electronic file stored in at least one repository in the networked computing environment to determine, based on the comparing, differences between a content within the electronic file and corresponding content within each of the set of electronic files;
    - compare meta data associated with the electronic file and contained within the electronic file with meta data associated with the set of electronic files and contained within the electronic file, the meta data comprising pitch sizes and markup meta data;
    - determine if the electronic file comprises the most current version based on the comparison before the electronic file is opened; and
    - identify and automatically open the most current version from the set of files if the determination indicates that the electronic file does not comprise the most current version.

* * * * *